(12) United States Patent
Pardo

(10) Patent No.: US 11,558,309 B1
(45) Date of Patent: Jan. 17, 2023

(54) EXPANDABLE QUEUE

(71) Applicant: MELLANOX TECHNOLOGIES, LTD., Yokneam (IL)

(72) Inventor: Ilan Pardo, Ramat-Hasharon (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/369,992

(22) Filed: Jul. 8, 2021

(51) Int. Cl.
*H04L 47/625* (2022.01)
*H04L 49/90* (2022.01)
*H04L 49/9005* (2022.01)
*H04L 47/62* (2022.01)

(52) U.S. Cl.
CPC ...... *H04L 47/6255* (2013.01); *H04L 47/6225* (2013.01); *H04L 49/9005* (2013.01); *H04L 49/9036* (2013.01)

(58) Field of Classification Search
None
See application file for complete search history.

(56) References Cited

U.S. PATENT DOCUMENTS

| | | | |
|---|---|---|---|
| 5,107,457 A | 4/1992 | Hayes et al. | |
| 5,361,372 A | 11/1994 | Rege et al. | |
| 5,873,089 A | 2/1999 | Regache | |
| 5,930,493 A | 7/1999 | Ottesen et al. | |

FOREIGN PATENT DOCUMENTS

| | | | | |
|---|---|---|---|---|
| EP | 3169002 A1 * | 5/2017 | ......... | H04B 7/18506 |
| WO | 1998036534 A1 | 8/1998 | | |

* cited by examiner

*Primary Examiner* — Alex Skripnikov
(74) *Attorney, Agent, or Firm* — Kligler & Associates Patent Attorneys Ltd

(57) ABSTRACT

A network device includes packet processing circuitry and queue management circuitry. The packet processing circuitry is configured to transmit and receive packets to and from a network. The queue management circuitry is configured to store, in a memory, a queue for queuing data relating to processing of the packets, the queue including a primary buffer and an overflow buffer, to choose between a normal mode and an overflow mode based on a defined condition, to queue the data only in the primary buffer when operating in the normal mode, and, when operating in the overflow mode, to queue the data in a concatenation of the primary buffer and the overflow buffer.

22 Claims, 3 Drawing Sheets

EXPANDABLE QUEUE

FIELD OF THE INVENTION

The present invention relates generally to computer systems, and particularly to methods and systems for circular buffer management in computer systems.

BACKGROUND OF THE INVENTION

Computer systems often use queues for communication between processes. The queues may be implemented as circular memory buffers.

U.S. Pat. No. 5,873,089 describes a data handling system in which a circular queue formed in a paged memory is used to buffer the transfer of data items between a producer entity and a consumer entity. The producer entity maintains a tail pointer into the queue to indicate the storage location next to be written to; similarly, the consumer entity maintains a head pointer to indicate the storage location next to be read. Since the head and tail pointers may point to different memory pages and these may not have been assigned in a contiguous block to the circular queue, the derivation of queue status information using the head and tail pointers is complex. To simplify this task, the producer and consumer entities maintain producer and consumer indexes for the next write and read positions based on a logical view of the queue as a circular continuum of storage locations.

PCT International Publication WO 1998/036534 describes a split-queue architecture and method of queuing entries to a three part queue. The first part of the queue is a write side in which entries to the queue are received. The second part of the queue is a read side from which entries exit the queue after flowing through the queue. Entries normally flow from the write side to the read side. An overflow area, located off-chip in an external memory, forms part of the queue on an as needed basis to store entries from the write side when the read side no longer has capacity to accept more entries from the write side. When the read side regains capacity to accept more entries, the overflow area transfers its entries to the read side.

SUMMARY OF THE INVENTION

An embodiment of the present invention that is described herein provides a network device including packet processing circuitry and queue management circuitry. The packet processing circuitry is configured to transmit and receive packets to and from a network. The queue management circuitry is configured to store, in a memory, a queue for queuing data relating to processing of the packets, the queue including a primary buffer and an overflow buffer, to choose between a normal mode and an overflow mode based on a defined condition, to queue the data only in the primary buffer when operating in the normal mode, and, when operating in the overflow mode, to queue the data in a concatenation of the primary buffer and the overflow buffer.

In some embodiments the queue is a cyclic queue, and the queue management circuitry is configured to queue the data cyclically in the primary buffer when operating in the normal mode, and to queue the data cyclically in the concatenation of the primary buffer and the overflow buffer when operating in the overflow mode.

In some embodiments, the queue management circuitry is configured to queue the data using zero-copy storage, both in the normal mode and in the overflow mode. In an embodiment, the queue management circuitry is configured to choose between the normal mode and the overflow mode responsive to a fill measure of the primary buffer.

In some embodiments, upon transitioning from the normal mode to the overflow mode, the queue management circuitry is configured to insert an overflow-transition marker following a most-recently written data unit in the queue, the overflow-transition marker indicating that a next data unit is to be accessed in the overflow buffer. In an embodiment, the queue management circuitry is configured to maintain a write pointer that points to a location in which the next data unit is to be written, including advancing the write pointer from the primary buffer to the overflow buffer upon encountering the overflow-transition marker. In a disclosed embodiment, the queue management circuitry is configured to maintain a read pointer that points to a location from which the next data unit is to be read, including advancing the read pointer from the primary buffer to the overflow buffer upon encountering the overflow-transition marker.

In another embodiment, the network device further includes a cache for caching at least some of the queued data, wherein a capacity of the cache is at least as large as the primary buffer but is smaller than the concatenation of the primary buffer and the overflow buffer. In some embodiments the queue is an ingress queue for queuing packets received from the network. In other embodiments the queue is an egress queue for queuing packets to be transmitted to the network.

There is additionally provided, in accordance with an embodiment of the present invention, a method including, in a network device, transmitting and receiving packets to and from a network. A queue, which includes a primary buffer and an overflow buffer, is stored in a memory for queuing data relating to processing of the packets in the network device. A choice is made, for the queue, between a normal mode and an overflow mode based on a defined condition. When operating in the normal mode, the data is queued in the primary buffer only. When operating in the overflow mode, the data is queued in a concatenation of the primary buffer and the overflow buffer.

The present invention will be more fully understood from the following detailed description of the embodiments thereof, taken together with the drawings in which:

DETAILED DESCRIPTION OF EMBODIMENTS

Overview

Figure 1:
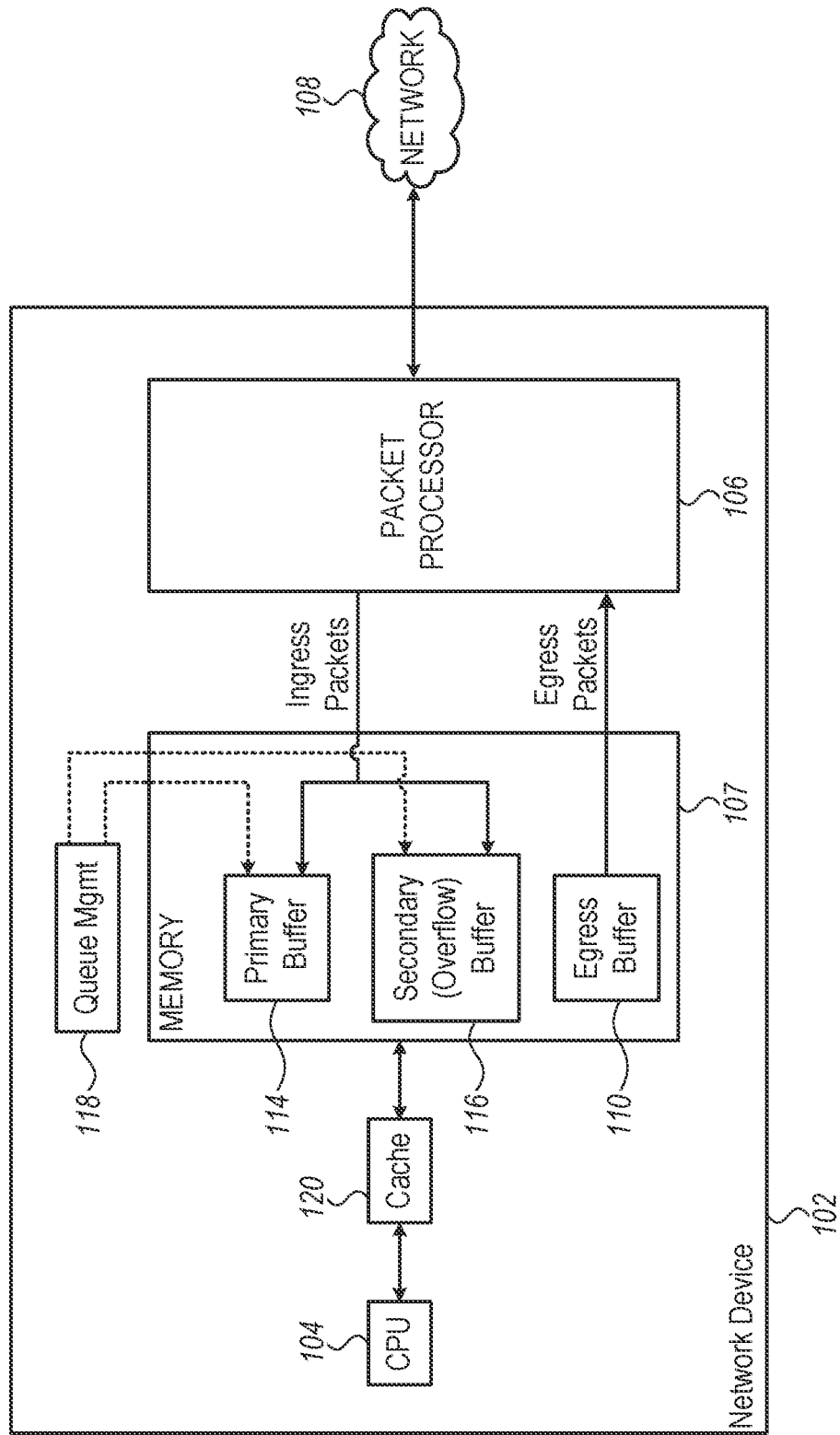
FIG. 1 is a block diagram that schematically describes a network device (ND), in accordance with an embodiment of the present invention.

Computer systems often use queues for communication between processes, e.g., wherein a first process writes data into the queue, and a second process reads the data.

Typically, a queue is implemented as a buffer; the first process writes into the buffer, at a location pointed to by a write pointer, whereas the second process reads the buffer, from a location pointed to by a read pointer. The read and the write operations are accompanied by an increment of the write/read pointers, which, after reaching the end of the buffer, wrap-around back to the beginning of the buffer (i.e., the buffer is circular).

We will refer to hereinbelow to the process that writes data in the queue as a Producer, and to the process that reads the data as a Consumer. Accordingly, we will sometimes refer to the write-pointer as Producer Index (PI), and to the Read Pointer as Consumer Index (CI).

On average, the rate at which the consumer reads data from the queue should match the rate in which the producer writes data; when the average reading rate is higher than the writing rate, the queue will empty and consumer reads will fail; when the average writing rate is higher than the reading rate, the queue will fill-up, and further writes will fail.

However, there may be bursts of data, wherein a large amount of data is written into the queue (or read from the queue) in a short period of time, at a rate which is higher than the average rate. For example, a Network-Device (ND) may comprise packet processing circuitry (PPC) that communicates packets over a network, and a processor; the PPC may be configured to post ingress packets in a queue, and the processor may be configured to read the queue and process the packets. The data rate of the packets may be low most of the time (e.g., because the packet rate is low and/or the packet sizes are small), processed by the processor shortly after arrival; hence, most of the time the queue size is small (or empty). However, occasionally, the PPC may receive bursts of data (e.g., longer packets and/or a higher packet rate), resulting in periods of time wherein the queue size sharply grows. Moreover, the emptying rate of the queue may also vary, e.g., due to varying availability of the processor.

To avoid loss of data, the queue should be designed to accommodate the largest anticipated size, e.g., when the largest data burst is received (in some practical cases, the largest size corresponds to a burst or a group of bursts which coincide with periods in which the CPU is busy in higher priority tasks and cannot handle the ingress packets). Accordingly, when the queue is a cyclic buffer, the buffer size is, preferably, greater than or equal to the largest amount of expected data.

Most of the time, the read pointer will closely follow the write pointer (the difference between the write pointer and the read pointer being the queue size). Occasionally, e.g., when bursts of data arrive, the distance between the write queue and the read queue grows, and then gradually shrinks when the producer write-rate decreases.

In some embodiments, the processor comprises one or more cache memories, which are configured to store the contents of frequently accessed locations in memory. Cache memories are typically fast, but relatively small. When a circular buffer, large enough to accommodate bursts of data, is used as a queue, the size of the buffer may be larger than the size of the cache memory, and, hence, the queue data cannot be efficiently cached. This is true for bursts of data, but also for small packets, because the write and read pointers, while closely following each other, span over the entire depth of the circular buffer.

In other words, consider a large circular queue that is written-to and read-from at approximately the same rate. Even if the queue is relatively empty at any given time, the read pointer and write pointer "crawl" over the entire circular queue and therefore span a large range of addresses. Since the cache memory is accessed by addresses, the fact that the queue is large degrades caching performance (increases the likelihood of "cache misses") regardless of the actual fill level of the queue.

Embodiments according to the present invention provide apparatuses and methods for varying size buffers, typically circular buffers, wherein the span of the read and write pointers is small when the queue size is small, and large when the queue size grows. As a result, the performance of caching the data in the queue is enhanced considerably.

In the present context, the terms "buffer" and "queue" are used interchangeably, and so are the terms "circular buffer" and "cyclic queue". The embodiments described herein refer mainly to cyclic queues, but the disclosed techniques are similarly applicable to other types of queues and buffers, not necessarily circular.

In an embodiment, the circular buffer comprises a Primary Buffer (PB), a Secondary Buffer (SB) (also referred to as Overflow Buffer—OFB) and a Queue Management Circuit (QMC), configured to control writes and reads to the PB and OFB. The PB is large enough to store the average packets, which are assumed to fit in the cache memory. When the packets are small, the QMC operates the queue in a Shallow Mode, wherein only the PB is used, allowing efficient cache operation. When the queue size grows, the QMC enters a Deep Mode, wherein the OFB is concatenated to the PB, forming a large circular buffer. Thus, cache efficiency is reduced but no data is lost. When the queue size shrinks again, the QMC gradually reverts back to the Shallow Mode that uses only the PB. The QMC typically transitions between the two modes seamlessly, with no data loss.

System Description

In the description of embodiments hereinbelow, we will refer mainly to network devices (NDs); embodiments in accordance with the present invention, however, are not limited to network devices and may encompass numerous other applications. Some examples include wireless communication, video processing, graphic processing, and distributed computing.

In the embodiments described below, we will refer to a circular buffer that has two modes of operation—a Shallow Mode, wherein a primary buffer that is relatively small is used, and a Deep Mode, wherein a Secondary Buffer ("overflow buffer") is appended to the Primary Buffer. The shallow mode and the deep mode are also referred to herein as "normal mode" and "overflow mode", respectively.

FIG. 1 is a block diagram that schematically describes a network device (ND) 102, in accordance with an embodiment of the present invention. ND 102 may comprise, for example, a network adapter such as an Ethernet Network Interface Controller (NIC) or Infiniband Host Channel Adapter (HCA), a Data Processing Unit (DPU—also referred to sometimes as "Smart-NIC"), a network switch or router, a network-enabled Graphics Processing Unit (GPU), or any other suitable kind of network device.

ND 102 comprises a Central Processing Unit (CPU) 104 (also referred to as "processor"), which is configured to communicate packets through a Packet Processor 106 (also referred to as "packet processing circuitry"), over a Communication Network 108.

According to the example embodiment illustrated in FIG. 1, the CPU communicates packets to the packet processor through a Memory 107, which comprises buffers to temporarily store ingress and egress packets. CPU 104 may write egress packets in an Egress Queue Buffer 110, which the packet processor then forwards to the Network. The description that follows focuses on the ingress direction, and the egress direction will not be discussed in detail. Nevertheless, the disclosed techniques are not limited to ingress queues and are equally applicable to egress queues, as well as other suitable queue types.

In the ingress direction, the packet processor writes received packets in a Primary Buffer 114 or a Secondary Buffer 116, as determined by a Queue Management Circuit (QMC) 118. QMC 118 comprises a write pointer that points at a location—either in Primary Buffer 114 or in Secondary Buffer 116—into which the next data item will be written in a buffer-write operation. Similarly, the QMC comprises a read pointer that points at a location in the Primary or the Secondary buffer from which the next buffer-read operation will take place. In the present example, both primary buffer 114 and secondary buffer 116 reside in memory 107, and the locations pointed-to by the write pointer and the read pointer are addresses in memory 107.

According to embodiments, when the size of Primary Buffer 114 is large enough to contain the queue data, QMC 118 is in a "Shallow Mode", directing buffer read and write operations to the primary buffer only, and wrapping-around in the primary buffer only. When the packet processor receives a burst of data for which there is no room in the primary buffer, the QMC enters a "Deep-Mode", wherein the Network Port writes data, and the CPU reads data, from a concatenation of the primary buffer and the secondary buffer. When in Shallow Mode, the write and read pointers point to locations in the primary buffer only. When in Deep Mode, the pointers may point to locations in the primary or the secondary buffer, and wrapping-around is performed across the concatenation of the primary buffer and the secondary buffer.

Network Device 102 further comprises a Cache Memory 120 that is coupled to CPU 104. The Cache Memory is configured to store frequently accessed memory locations of memory 107. When the QMC is in the Deep Mode, the write and read pointers span ("crawl over") a range which is beyond the cache capacity and, hence, the cache efficiency is low. However, most of the time the QMC is in the Shallow-Mode; the write and read pointers span the depth of the primary buffer only, which, in embodiments, entirely fits in the cache; hence, the complete queue will be in the cache only (e.g., will not be written to the primary buffer), and the cache efficiency will increase. In other words, the capacity of the cache is chosen to be at least as large as the primary buffer, but smaller than the concatenation of the primary buffer and the secondary (overflow) buffer.

Thus, according to the example embodiment illustrated in FIG. 1, when most of the packets are short, the division to a primary buffer that is active in Shallow Mode and a secondary buffer that is added in the rare case of Deep Mode, allows efficient data caching wherein complete packets may fit in the cache.

As would be appreciated, the configuration of ND 102, including packet processor 106, primary buffer 114, secondary buffer 116 and QMC 118, illustrated in FIG. 1 and described above, is an example configuration that is depicted purely for the sake of conceptual clarity. Other suitable configurations may be used in alternative embodiments of the present invention.

For example, secondary buffer 116 may be in an external memory that is coupled to the packet processor and the CPU (e.g., a peripheral memory card that is accessed through a Peripheral Component Interconnect Express—PCIe bus). In an embodiment, there may be a Shallow Mode for short packets, a Medium-Deep Mode for medium size packets and a Deep Mode for large packets, and the ingress queue may comprise a primary buffer for the short packets, a secondary buffer for the medium-sized packets and a tertiary buffer for the large packets (more levels may be used in yet other embodiments). In embodiments, there may be more than one CPU; in other embodiments CPU 104 may be a Graphic Processor Unit (GPU).

In various embodiments, the disclosed technique can be implemented for the Egress buffer, which will be split to a primary buffer and a secondary buffer that are controlled by a queue management circuit. In an embodiment, the technique is implemented for both the Egress and the Ingress queues.

FIG. 2A is an operation-mode diagram that schematically illustrates the operation of a PB 202 and an OFB 204 in Shallow Mode, in accordance with an embodiment of the present invention. A Write Pointer (WP) 206 points at the write location in PB, and increments upon every write cycle, wrapping to the first address after reaching the last address of PB 202. a Read Pointer (RP) 208 similarly points to a read location in the PB, and increments when a Read occurs, wrapping back to the first address after reaching the last address. OFB is not used, and the maximum size of the queue equals the depth of PB 202, which, in embodiments, fits in cache memory 120 (FIG. 1).

FIG. 2B is an operation-mode diagram that schematically illustrates overflow detection, in accordance with an embodiment of the present invention. While in Shallow Mode, the producer process needs to write data in the circular buffer, but the read pointer and the write pointer are equal, and the new data may overwrite old data in the PB that the consumer process has not read yet. This situation, which may happen in response to receiving a burst of data, is referred to as overflow detection. According to the example embodiment illustrated in FIG. 2B, the producer, responsive to an overflow detection, writes the data in the first address of OFB 204, and sets WP 206 to point thereto. In some embodiments, the producer adds a marker to the data in the PB at the last WP location, indicating to the consumer that, after reaching this location, the next address to be read is the first address of OFB 204. The buffers now enter the Deep Mode.

FIG. 2C is an operation-mode diagram that schematically illustrates the operation of PB 202 and OFB 204 in Deep Mode, in accordance with an embodiment of the present invention. PB 202 and OFB 204 are now concatenated, forming a large circular buffer. WP 206 and RP 208, when incrementing, cross from the last address of PB 202 to the first address of OFB 204, and, when reaching the last address of OFB 204, wrap back to the first address of PB 202. The concatenated buffer contains large data bursts with no data loss; however, cache 116 (FIG. 1) cannot accommodate the larger address space, and the cache performance degrades.

FIG. 2D is an operation-mode diagram that schematically illustrates a return-to-Shallow-Mode condition, in accordance with an embodiment of the present invention. The PB and OFB are in Deep Mode but the data burst is over and the queue narrows. At some point, WP 206 points to a location in PB 202, and RP 204 wraps to the first location of PB 202 (after reading from the last address of OFB 204). The size of the queue is now small enough to be handled by the PB, and the buffers may reenter Narrow Mode.

According to the example embodiment illustrated in FIG. 2D, when the queue narrows, prior to reentering Shallow Mode, both WP 206 and RP 204 point to PB 202; if the queue narrows while the WP points to a location in the OFB, Deep Mode will remain to be on, until both WP and RP will point at the PB. In some embodiments, this condition is not necessary—if the queue narrows while the write pointer points to the OFB, Shallow Mode may be entered immediately, by setting WP 206 to the first address of PB 202 and, optionally, mark the address in OFB so that, when the RP reaches that location, the RP will wrap to the first address of the PB.

Thus, the QMC manages the write and read pointers; in Shallow Mode, wherein the queue is contained in the Primary Buffer, and in Deep Mode herein the queue is contained in the concatenation of Primary and Overflow buffers, with seamless transitions between the modes.

As can be appreciated from the description above, in some embodiments QMC 118 queues the data using entirely "zero-copy" storage. The term "zero-copy" means that the queued data does not flow along the queue in order to be available at the output. Instead, the read and write pointers move so as to point to the appropriate read and write locations. In some embodiments, zero-copy storage is used both in the shallow mode and in the deep mode, as well as during transitions between them.

As would be appreciated, the operation-mode diagrams illustrated in FIGS. 2A through 2D are example operation modes that are cited by way of example. Other operation modes may be used in alternative embodiments. For example, in some embodiments, the QMC is configured to support overflow in Deep Mode, for example, by overwriting ingress data.

Figure 3:
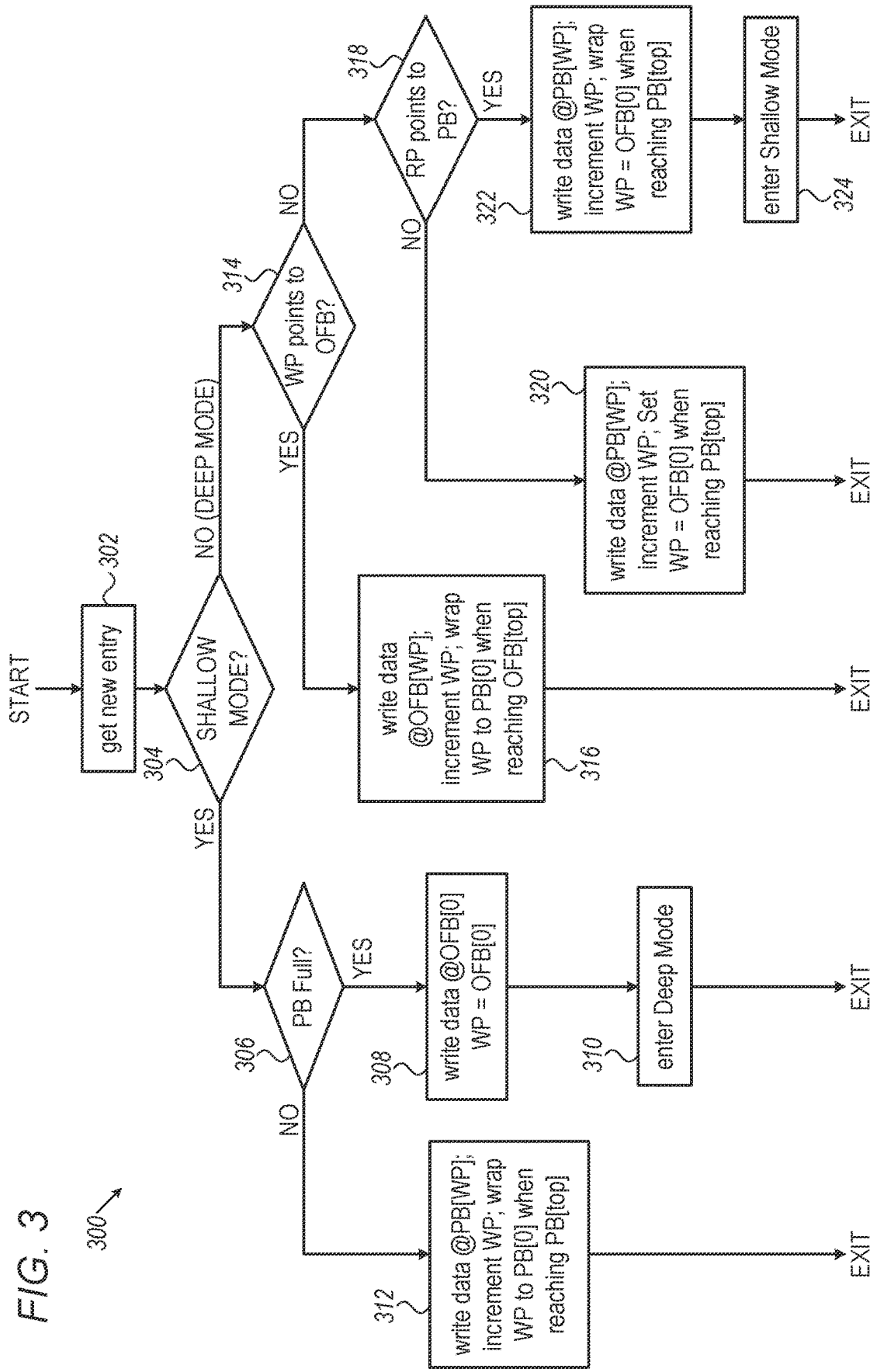
FIG. 3 is a flowchart that schematically illustrates a method for managing a variable size circular buffer, in accordance with an embodiment of the present invention.

FIG. 3 is a flowchart 300 that schematically illustrates a method for a variable size circular buffer, in accordance with an embodiment of the present invention. The flow is executed by QMC 118 (FIG. 1).

The flow starts at a Get New Entry step 302, wherein the QMC directs a new data entry to be written in the queue. The QMC then, in a Check-Mode step 304, checks if the current mode is Shallow. If so, the QMC enters a Check-PB-Full step 306, and checks if the PB is full (e.g., the address for writing data into the PB (WP) is equal to the next Read address (RP)). If so, the QMC enters a Write-OFB-0 step 308, direct the data entry to the first address of the OFB buffer, and, in an Enter-Deep-Mode step 310, enters Deep-Mode.

If, in step 306, the buffer is not full, the QMC enters a Write-in-PB step 312, wherein the QMC directs the data entry to the next PB address, and then the WP increments, wrapping to the first PB address if the last address has been reached.

If, in step 304, the QMC is in the Deep Mode, the QMC enters a Check-WP-Buffer step 314 and checks if the WP points to an address in the OFB. If so, the QMC enters a Write-OFB step 316, directs the data entry to the location (in OFB) pointed to by the WP, and increments the WP (wrapping to the first address of the PB if the end of the OFB is reached).

If, in step 314, the WP points to a location in the PB, the QMC enters a Check-RP-in-PB step 318; if the RP does not point to the PB, the QMC enters a Write-in-PB step 320, wherein the QMC directs the data entry to the location pointed to by WP, and then increments WP, crossing from the last PB address to the first OFB address.

If, in step 318, both the WP and the RP point to the PB, the queue has shrunk, and Shallow Mode can be entered. The QMC enters a Write-in-PB step 322, wherein the QMC directs the data entry to the next PB address, and then the WP increments, wrapping to the first PB address if the last address has been reached. The QMC then, in an Enter Shallow-Mode step 324, enters Shallow mode.

After steps 310, 312, 316, 320 and 324 the flowchart ends.

As would be appreciated, the flowchart illustrated in FIG. 3 and described hereinabove is an example embodiment that is cited by way of example. Other flowcharts may be used in alternative embodiments. For example, in some embodiments, when the queue narrows, Deep Mode may be exited when the WP points to the OFB. In other embodiments, some of the steps described above may be done in a different order and/or concurrently.

Determining the Next RP Value

In the discussion above, we described in detail how the WP is incremented, spanning the length of the PB in Shallow Mode, and the length of the combined PB-OFB in Deep Mode. The RP is incremented in a similar way, except that, upon entering Deep Mode, the RP should continue reading entries from the PB until the RP reaches the point in which, when the PB was full, the QMC set the WP to the first OFB address (we will refer to the value of the WP at which Deep Mode was entered as the Jump Address).

In embodiments, when the QMC enters the Deep Mode, the QMC writes in the PB an indication that is associated with the Jump Address. In some embodiments, the PB comprises an additional jump-field (e.g., a bit) in each entry, which is used to indicate a Jump Address; when the RP reads an entry with the jump-field set, the QMC will set the RP to the first OFB address.

In other embodiments, the Jump Address (and, sometimes, a Deep Mode indication) are stored in a dedicated register in the QMC; when Deep Mode is entered, the register is updated accordingly, and when Shallow Mode is entered, the register is cleared. The QMC is configured to set the RP to the first address of the OFB when the RP reaches the address indicated in the register.

In yet other embodiments, no marking is used; instead, an RP mode is defined, which may be Shallow or Deep, and, responsively to a Queue-Read:

i) If RP Mode equals Shallow and WP points to the OFB, the QMC sets the RP to the first OFB address, and the RP mode is set to Deep;

ii) if both RP and WP point to addresses in the PB, the QMC sets the RP mode to Shallow Mode;

iii) else RP increments; if the RP is in Shallow Mode, wrapping from the last PB address to the first PB address; if the RP is in Deep Mode, crossing from the last PB address to the first OFB address and from the last OFB address to the first PB address.

The techniques described above for determining the next RP value may also be used, mutatis mutandis, in embodiments wherein Shallow Mode may be entered while the WP points to a location in the OFB (as described above).

Figure 2:
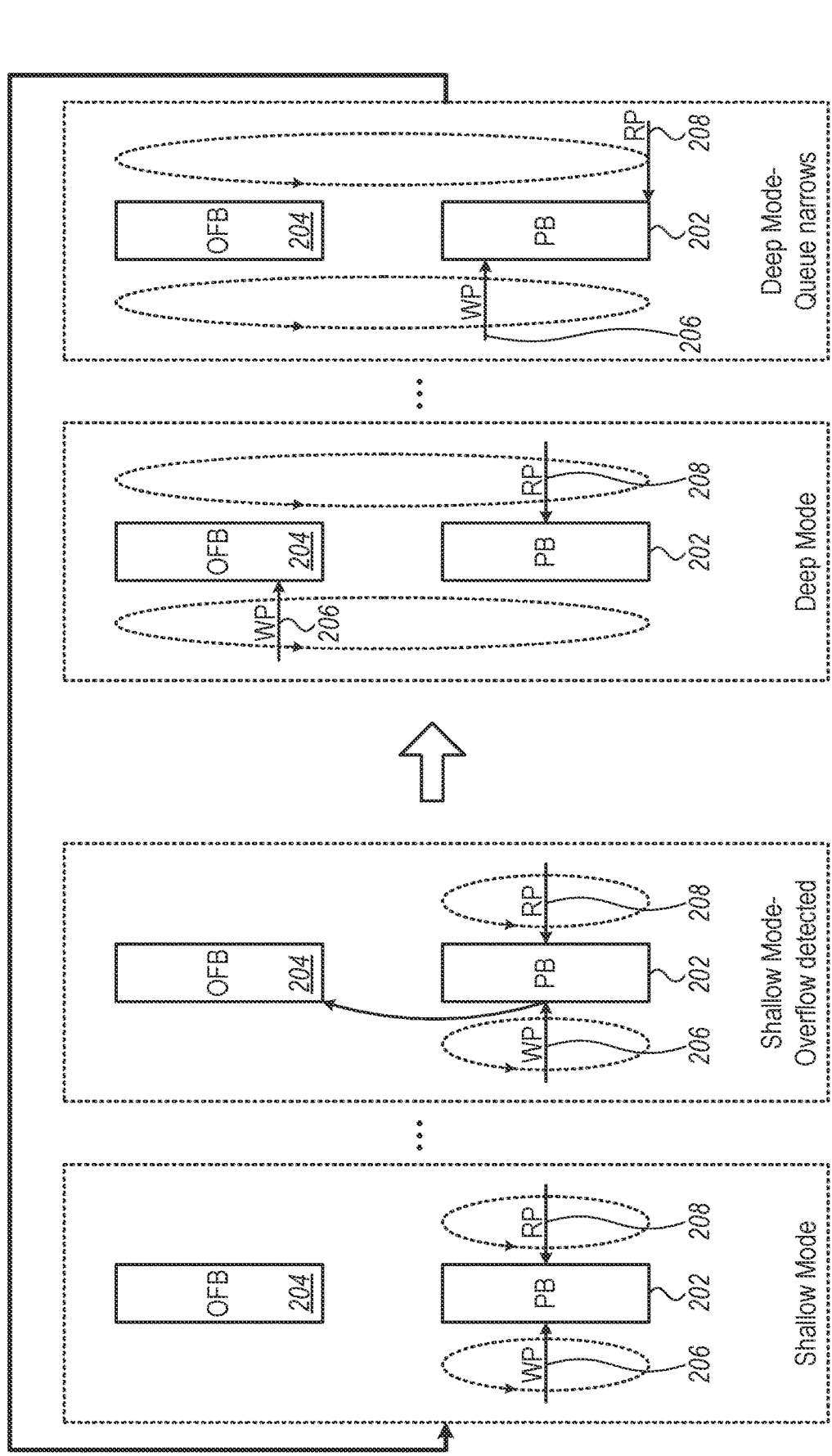
FIG. 2A is an operation-mode diagram that schematically illustrates the operation of a Primary Buffer (PB) and an Overflow Buffer (OFB), in Shallow Mode, in accordance with an embodiment of the present invention.
FIG. 2B is an operation-mode diagram that schematically illustrates overflow detection, in accordance with an embodiment of the present invention.
FIG. 2C is an operation-mode diagram that schematically illustrates the operation of a PB and an OFB in Deep Mode, in accordance with an embodiment of the present invention.
FIG. 2D is an operation-mode diagram that schematically illustrates a return-to-Shallow-Mode condition, in accordance with an embodiment of the present invention.

The configurations of ND 102, including packet processor 106, primary buffer 114, secondary buffer 116 and queue management circuit 118; the operation modes of the primary and secondary buffers and flowchart 300; illustrated in FIGS. 1 through 3 and described hereinabove, are example configurations, operation modes and flowcharts that are shown purely for the sake of conceptual clarity. Any other suitable configurations, operation modes and flowcharts can be used in alternative embodiments. ND 102 may be replaced by any other suitable computing device that communicates with an external device using one or more queues. The different sub-units of ND 102 may be implemented using suitable hardware, such as in one or more Application-Specific Integrated Circuits (ASICs) or Field-Programmable Gate Arrays (FPGAs), using software, using hardware, or using a combination of hardware and software elements.

CPU 104 (FIG. 1) may comprise a general-purpose processor, which is programmed in software to carry out the functions described herein. The software may be downloaded to the processor in electronic form, over a network or from a host, for example, or it may, alternatively or additionally, be provided and/or stored on non-transitory tangible media, such as magnetic, optical, or electronic memory.

Although the embodiments described herein mainly address expandable queues in computing systems, the methods and systems described herein can also be used in other applications, such as in communication systems and delivery systems.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network device, comprising:
    packet processing circuitry, which is configured to transmit and receive packets to and from a network; and
    queue management circuitry, configured to:
        store, in a memory, a queue for queuing data relating to processing of the packets, the queue comprising a primary buffer and an overflow buffer;
        maintain a write pointer that points to a next location to be written-to in the queue, and a read pointer that points to a next location to be read-from in the queue;
        choose between a normal mode and an overflow mode based on a defined condition;
        when operating in the normal mode, set the queue to include only the primary buffer, and queue the data in the queue by confining the write pointer and the read pointer to increment only within the primary buffer; and
        when operating in the overflow mode, set the queue to include a concatenation of the primary buffer and the overflow buffer, and queue the data in the queue by allowing the write pointer and the read pointer to increment over both the primary buffer and the overflow buffer.

2. The network device according to claim 1, wherein the queue is a cyclic queue, and wherein the queue management circuitry is configured to confine the write pointer and the read pointer to increment cyclically only within the primary buffer when operating in the normal mode, and to allow the write pointer and the read pointer to increment cyclically over both the primary buffer and the overflow buffer when operating in the overflow mode.

3. The network device according to claim 1, wherein the queue management circuitry is configured to queue the data using zero-copy storage, both in the normal mode and in the overflow mode.

4. The network device according to claim 1, wherein the queue management circuitry is configured to choose between the normal mode and the overflow mode responsive to a fill measure of the primary buffer.

5. The network device according to claim 1, wherein, upon transitioning from the normal mode to the overflow mode, the queue management circuitry is configured to insert an overflow-transition marker following a most-recently written data unit in the queue, the overflow-transition marker indicating that a next data unit is to be accessed in the overflow buffer.

6. The network device according to claim 5, wherein the queue management circuitry is configured to advance the write pointer from the primary buffer to the overflow buffer upon encountering the overflow-transition marker.

7. The network device according to claim 5, wherein the queue management circuitry is configured to advance the read pointer from the primary buffer to the overflow buffer upon encountering the overflow-transition marker.

8. The network device according to claim 1, further comprising a cache for caching at least some of the queued data, wherein a capacity of the cache is at least as large as the primary buffer but is smaller than the concatenation of the primary buffer and the overflow buffer.

9. The network device according to claim 1, wherein the queue is an ingress queue for queuing packets received from the network.

10. The network device according to claim 1, wherein the queue is an egress queue for queuing packets to be transmitted to the network.

11. A method, comprising:
    in a network device, transmitting and receiving packets to and from a network;
    storing, in a memory, a queue for queuing data relating to processing of the packets in the network device, the queue comprising a primary buffer and an overflow buffer;
    maintaining a write pointer that points to a next location to be written-to in the queue, and a read pointer that points to a next location to be read-from in the queue;
    choosing, for the queue, between a normal mode and an overflow mode based on a defined condition;
    when operating in the normal mode, setting the queue to include only the primary buffer, and queuing the data in the queue by confining the write pointer and the read pointer to increment only within the primary buffer; and
    when operating in the overflow mode, setting the queue to include a concatenation of the primary buffer and the overflow buffer, and queuing the data in the queue by allowing the write pointer and the read pointer to increment over both the primary buffer and the overflow buffer.

12. The method according to claim 11, wherein the queue is a cyclic queue, and wherein queuing the data comprises confining the write pointer and the read pointer to increment cyclically only within the primary buffer when operating in the normal mode, and allowing the write pointer and the read pointer to increment cyclically over both the primary buffer and the overflow buffer when operating in the overflow mode.

13. The method according to claim 11, wherein queuing the data is performed using zero-copy storage, both in the normal mode and in the overflow mode.

14. The method according to claim 11, wherein choosing between the normal mode and the overflow mode is performed responsive to a fill measure of the primary buffer.

15. The method according to claim 11, and comprising, upon transitioning from the normal mode to the overflow mode, inserting an overflow-transition marker following a most-recently written data unit in the queue, the overflow-transition marker indicating that a next data unit is to be accessed in the overflow buffer.

16. The method according to claim 15, wherein queuing the data comprises advancing the write pointer from the primary buffer to the overflow buffer upon encountering the overflow-transition marker.

17. The method according to claim 15, wherein queuing the data comprises advancing the read pointer from the primary buffer to the overflow buffer upon encountering the overflow-transition marker.

18. The method according to claim 11, further comprising caching at least some of the queued data in a cache, wherein a capacity of the cache is at least as large as the primary buffer but is smaller than the concatenation of the primary buffer and the overflow buffer.

19. The method according to claim 11, wherein the queue is an ingress queue for queuing packets received from the network.

20. The method according to claim 11, wherein the queue is an egress queue for queuing packets to be transmitted to the network.

21. A network device, comprising:
packet processing circuitry, which is configured to transmit and receive packets to and from a network; and
queue management circuitry, configured to:
  store, in a memory, a queue for queuing data relating to processing of the packets, the queue comprising a primary buffer and an overflow buffer;
  choose between a normal mode and an overflow mode based on a defined condition;
  when operating in the normal mode, queue the data in the primary buffer only;
  when operating in the overflow mode, queue the data in a concatenation of the primary buffer and the overflow buffer; and
  upon transitioning from the normal mode to the overflow mode, insert an overflow-transition marker following a most-recently written data unit in the queue, the overflow-transition marker indicating that a next data unit is to be accessed in the overflow buffer.

22. A method, comprising:
in a network device, transmitting and receiving packets to and from a network;
storing, in a memory, a queue for queuing data relating to processing of the packets in the network device, the queue comprising a primary buffer and an overflow buffer;
choosing, for the queue, between a normal mode and an overflow mode based on a defined condition;
when operating in the normal mode, queuing the data in the primary buffer only;
when operating in the overflow mode, queuing the data in a concatenation of the primary buffer and the overflow buffer; and
upon transitioning from the normal mode to the overflow mode, inserting an overflow-transition marker following a most-recently written data unit in the queue, the overflow-transition marker indicating that a next data unit is to be accessed in the overflow buffer.

* * * * *